US010408052B2

(12) United States Patent
Mandal et al.

(10) Patent No.: US 10,408,052 B2
(45) Date of Patent: Sep. 10, 2019

(54) MEASURING FREQUENCY-DEPENDENT ACOUSTIC ATTENUATION

(71) Applicant: Halliburton Energy Services, Inc., Houston, TX (US)

(72) Inventors: Batakrishna Mandal, Missouri City, TX (US); Srinivasan Jagannathan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 249 days.

(21) Appl. No.: 15/314,617

(22) PCT Filed: Apr. 28, 2016

(86) PCT No.: PCT/US2016/029749
§ 371 (c)(1),
(2) Date: Nov. 29, 2016

(87) PCT Pub. No.: WO2016/191028
PCT Pub. Date: Dec. 1, 2016

(65) Prior Publication Data
US 2017/0183961 A1    Jun. 29, 2017

Related U.S. Application Data

(60) Provisional application No. 62/165,752, filed on May 22, 2016.

(51) Int. Cl.
*E21B 47/18*   (2012.01)
*E21B 47/00*   (2012.01)
(Continued)

(52) U.S. Cl.
CPC ........ *E21B 47/182* (2013.01); *E21B 47/0005* (2013.01); *E21B 49/08* (2013.01);
(Continued)

(58) Field of Classification Search
CPC .... E21B 49/08; E21B 47/182; E21B 47/0005; G01V 1/46; G01V 1/50
See application file for complete search history.

(56) References Cited

U.S. PATENT DOCUMENTS

| 4,571,693 | A | * | 2/1986 | Birchak | ................ E21B 47/101 |
|---|---|---|---|---|---|
| | | | | | 702/54 |
| 4,991,124 | A | * | 2/1991 | Kline | ....................... G01N 9/24 |
| | | | | | 250/301 |

(Continued)

OTHER PUBLICATIONS

International Preliminary Report on Patentability issued in related PCT Application No. PCT/US2016/029749 dated Dec. 7, 2017, 12 pages.

(Continued)

*Primary Examiner* — John Fitzgerald
(74) *Attorney, Agent, or Firm* — Benjamin Fite; Baker Botts L.L.P.

(57) ABSTRACT

Methods and systems for frequency-dependent fluid attenuation measurement are provided. In certain embodiments, the methods comprise: generating one or more reference acoustic signals within a reference fluid; receiving one or more reference acoustic signal reflections; determining a frequency-dependent response function based, at least in part, on the one or more reference acoustic signal reflections; generating one or more sample acoustic signals within a sample fluid; receiving one or more sample acoustic signal reflections; and determining a frequency-dependent attenuation function of the sample fluid based, at least in part, on the one or more sample acoustic signal reflections and the frequency-dependent response function.

13 Claims, 6 Drawing Sheets

(51) Int. Cl.
*E21B 49/08* (2006.01)
*G01V 1/46* (2006.01)
*G01V 1/50* (2006.01)
*G01V 1/52* (2006.01)

(52) U.S. Cl.
CPC .............. *G01V 1/46* (2013.01); *G01V 1/50* (2013.01); *G01V 2001/526* (2013.01)

(56) References Cited

U.S. PATENT DOCUMENTS

| | | | | |
|---|---|---|---|---|
| 6,295,873 B1* | 10/2001 | Condreva | ............ | G01N 29/024 73/597 |
| 6,763,698 B2* | 7/2004 | Greenwood | ............ | G01N 9/002 73/30.01 |
| 6,912,891 B2* | 7/2005 | Coupland | ............ | G01N 29/022 73/61.45 |
| 6,957,700 B2* | 10/2005 | Mandal | ................ | E21B 49/003 166/250.01 |
| 7,107,851 B2* | 9/2006 | Owen | ...................... | G01H 5/00 702/54 |
| 7,377,169 B2* | 5/2008 | Myers | ................. | G01N 29/024 73/152.18 |
| 7,516,655 B2* | 4/2009 | DiFoggio | ................ | E21B 49/10 73/152.58 |
| 7,523,640 B2* | 4/2009 | DiFoggio | ................ | E21B 49/10 73/19.03 |
| 7,587,936 B2* | 9/2009 | Han | ........................ | E21B 47/01 367/25 |
| 8,733,153 B2* | 5/2014 | Reimer | ................. | F01N 3/2066 73/61.61 |
| 8,794,062 B2* | 8/2014 | DiFoggio | ................ | E21B 47/101 73/152.19 |
| 2005/0028579 A1* | 2/2005 | Owen | ...................... | G01H 5/00 73/24.06 |
| 2005/0204808 A1 | 9/2005 | Difoggio | | |
| 2005/0223808 A1* | 10/2005 | Myers | ................. | G01N 29/024 73/629 |
| 2008/0186805 A1 | 8/2008 | Han | | |
| 2010/0315900 A1* | 12/2010 | DiFoggio | ................ | G01V 1/40 367/27 |
| 2011/0018735 A1 | 1/2011 | Garcia-Osuna et al. | | |
| 2013/0010439 A1 | 1/2013 | Pabon et al. | | |
| 2014/0177388 A1 | 6/2014 | D'Angelo | | |
| 2016/0334255 A1* | 11/2016 | Gestner | ..................... | G01F 1/66 |

OTHER PUBLICATIONS

International Search Report and Written Opinion issued in related PCT Application No. PCT/US2016/029749 dated Jul. 18, 2016, 15 pages.

* cited by examiner

MEASURING FREQUENCY-DEPENDENT ACOUSTIC ATTENUATION

CROSS-REFERENCE TO RELATED APPLICATION

The present application is a U.S. National Stage Application of International Application No. PCT/US2016/029749 filed Apr. 28, 2016, which claims benefit of U.S. Provisional Application No. 62/165,752 filed May 22, 2015, both of which are incorporated herein by reference in their entirety for all purposes.

The present disclosure relates generally to well drilling and completion operations, and more particularly, to frequency-dependent fluid attenuation measurement.

Well drilling and completion operations typically require the use of casings within a wellbore in a subterranean formation to ensure that the wellbore does not collapse once it is drilled and that sensitive areas of the formation are protected and isolated. In most cases the casings are secured in the wellbore using a cement layer that fills an annulus between and bonds to both the casing and the formation. The strength of both cement bonds is important to the integrity of the well. Measuring cement impedance can provide information about the strength of the cement bonds.

Some casing and cement evaluation tools transmit an acoustic pulse into the casing and cement layer, and receive an echo signal of that pulse. The echo signal may include reflections and reverberations caused by the casing, the cement layer, and an interface between the two. These reflections and reverberations may be used, in part, to calculate downhole characteristics, including cement impedance. Some formation-evaluation tools also use acoustic pulses to transmit sound into the surrounding formation and collect echo signals, which provide information about the impedances of material in the formation. In some instances, wellbore fluids, such as drilling mud and other formation fluids, may be present within the casing such that the acoustic pulse must be transmitted through the wellbore fluid. The fluid speed and attenuation characteristics of the wellbore fluid may alter or otherwise affect the initial acoustic pulse and the reflections and reverberations. Typical calculations to determine cement impedance may account for these effects, but the accuracy of the resulting determination depends, in part, on the accuracy of the fluid speed and attenuation values used in the calculations. Traditional methods of determining acoustic attenuation report a single value for attenuation across all frequencies. However, attenuation can be frequency dependent, and thus single attenuation values are often inaccurate.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to frequency-dependent fluid attenuation measurement.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The present disclosure provides methods comprising: generating one or more reference acoustic signals within a reference fluid; receiving one or more reference acoustic signal reflections; determining a frequency-dependent response function based, at least in part, on the one or more reference acoustic signal reflections; generating one or more sample acoustic signals within a sample fluid; receiving one or more sample acoustic signal reflections; and determining a frequency-dependent attenuation function of the sample fluid based, at least in part, on the one or more sample acoustic signal reflections and the frequency-dependent response function.

In certain embodiments, the present disclosure provides methods comprising: generating one or more sample acoustic signals with a rotating head transducer within a sample fluid in a wellbore; receiving one or more sample acoustic signal reflections at the rotating head transducer from at least a portion of the wellbore, wherein each of the one or more sample acoustic signal reflections comprises an initial reflection portion; and determining a frequency-dependent attenuation function of the sample fluid based, at least in part, on at least one of the initial reflection portions.

In certain embodiments, the present disclosure provides systems comprising: a downhole tool; a transducer coupled to the downhole tool; and a controller communicably coupled to the transducer and configured to cause the transducer to generate one or more sample acoustic signals; cause the transducer to receive one or more sample acoustic signal reflections, wherein each of the one or more sample acoustic signal reflections comprises an initial reflection portion; and determine a frequency-dependent attenuation function of the sample fluid based, at least in part, on at least one of the initial reflection portions.

As used herein, "attenuation" refers to the loss of energy in a signal as a wave travels through a medium. In some embodiments, the energy loss may be due to absorption and/or scattering. Scattering may be caused by particles suspended in the medium. In certain embodiments, attenuation may depend on environmental factors such as temperature and pressure, as well as the structural make-up of the medium. In certain embodiments, for example, an oil-based mud may have completely different attenuation properties than a similar weight water-based mud.

Attenuation may be frequency dependent, and, in certain situations, higher frequencies are more attenuated than lower frequencies. In certain embodiments, when attenuation is highly frequency dependent, a frequency-dependent attenuation function may be more accurate than a single attenuation value for all frequencies. Such a frequency-dependent attenuation function may be used in models for cement evaluation, pipe-thickness measurements, acoustic calipers, or any other suitable model.

Figure 1:
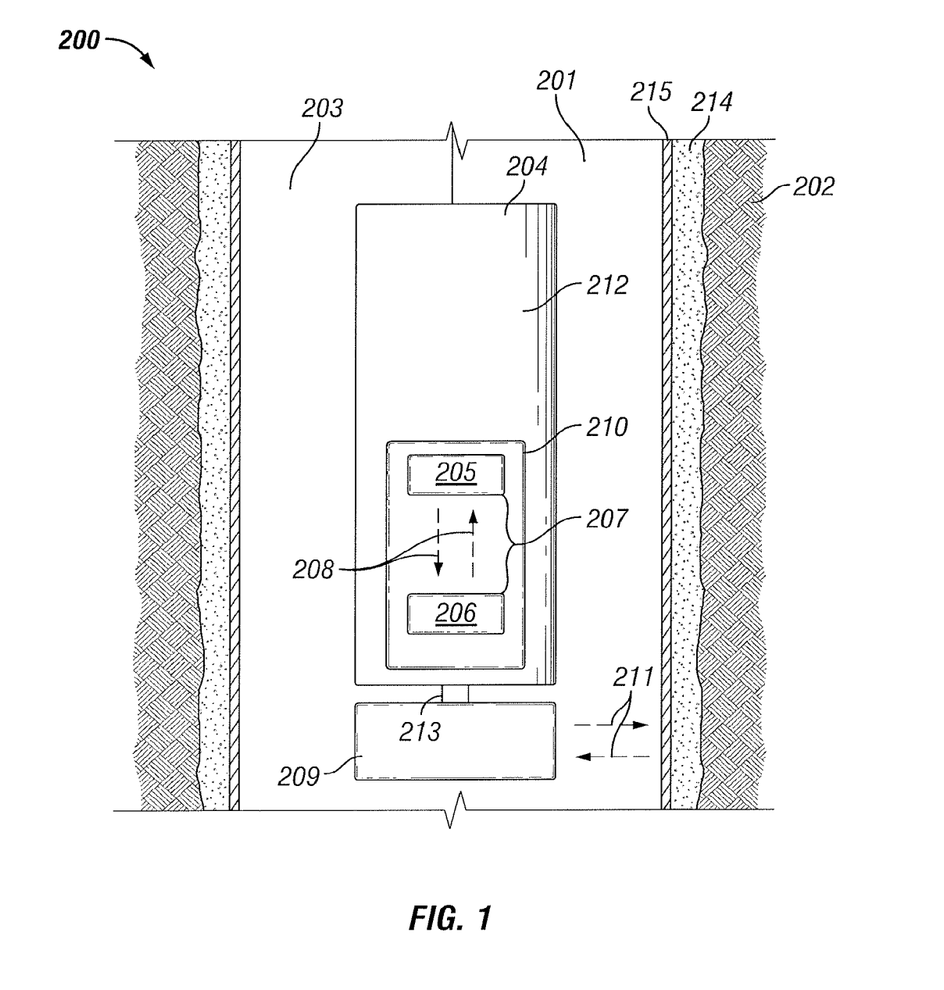
FIG. 1 is a diagram illustrating an example acoustic attenuation measurement system according to certain embodiments of the present disclosure.

FIG. 1 is a diagram illustrating a system for attenuation measurement 200, according to certain embodiments of the present disclosure. The system 200 comprises a wellbore 201 disposed in a portion of a subterranean formation 202. The wellbore 201 may include a fluid media 203. In some embodiments, the fluid media 203 may be at least one of a sample fluid, a drilling fluid, a completion fluid, a wellbore treatment fluid, or any other suitable wellbore fluid. As depicted, a downhole tool 204 may be disposed within a casing 215 that is secured in the wellbore 201 by a cement layer 214 that substantially fills the annulus between the casing 215 and the subterranean formation 202. A downhole tool 204 comprising an elongated tool body 212, a transducer 205, and an acoustic target 206 can be positioned within the wellbore 201. Example transducers include, but are not limited to, piezoelectric crystals, geophones, electromagnetic elements, etc. In some embodiments, the transducer 205 and acoustic target 206 can be included in or with a "mud cell" 210 positioned within the downhole tool 204. The mud cell 210 may comprise fluid inlets and outlets to allow fluid media to flow in and out of the cell. The space between the transducer 205 and the acoustic target 206 can be filled with the fluid media 203. In some embodiments, the downhole tool 204 may also comprise a receiver, transmitter, and/or other transceiver (not shown). In some embodiments, the acoustic target 206 may comprise a steel block. Although the acoustic target 206 is shown as a block within the mud cell 210, the acoustic target 206 may also be a portion of the wellbore 201. In some embodiments, the acoustic target 206 may be the casing 215. The transducer 205 can be positioned a known standoff distance 207 from the acoustic target 206. Signals 208 can be transmitted between the transceiver 205 and the acoustic target 206. Once received by the transducer 205, the signals 208 may be processed by one or more control systems (not shown) to calculate or otherwise determine a characteristic of the wellbore 201 or fluid media 203, such as the cement impedance or frequency-dependent attenuation function. As used herein, a control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), field programmable gate arrays (FPGA), or any other digital or analog circuitry configured to interpret and/or execute program instructions and/or process data. The control system may be disposed within the tool 204, at the surface of the formation, at an intermediate position, or a combination thereof (e.g., using split processing).

In certain embodiments, the system for attenuation measurement 200 comprises a rotating head transducer 209 comprising a rotating head to which a transducer is coupled. In certain embodiments, the downhole tool 204 may comprise both a rotating heat transducer 209 and a transducer 205 within a mud cell 210. In some embodiments, the system for attenuation measurement 200 may comprise only one of the rotating head transducer 209 or the transducer 205. As depicted, the rotating head transducer 209 is positioned at a distal end of the elongated tool body 212. In other embodiments, the rotating head transducer 209 may be positioned at one or more intermediate portions of the elongated tool body 212, which may provide greater flexibility with respect to the tool design. As depicted, the diameter of the rotating head transducer 209 is the same as the diameter of the elongated tool body 212, but other configurations are possible within the scope of the present disclosure.

The rotating head transducer 209 may be driven by an electric motor (not shown) or another suitable drive mechanism that provides for the controlled rotational movement of the rotating head transducer 209 with respect to the tool 204. As depicted, the rotating head transducer 209 may be driven through a shaft 213 connecting the rotating head transducer 209 to a drive mechanism within the elongated tool body 212. Power for the drive mechanism and other elements within the tool 204 may be provided, for instance, through the means of suspension, or by one or more power sources, e.g., batteries, capacitors, generators, within the tool 204.

In some embodiments, the rotating head transducer 209 may be positioned in the wellbore 201 and an acoustic target may be a portion of the wellbore 201. In some embodiments, the rotating head transducer 209 sends out a plurality of signals 211 or "shots" as it rotates in the wellbore 201. The signals 211 are not limited with respect to frequency and can but are not required to be ultrasonic pulses. The signals 211 may contact, be reflected by, and/or cause to reverberate a portion of the wellbore 201, such as the casing 215, the cement layer 214, and the interface between the casing 215 and the cement layer 214. These reflections and reverberations may comprise an echo signal 211 that is received by the transducer 209. Although not shown, instead of a rotating head transducer 209, the whole tool 204 or a portion thereof having a transducer can be rotated to accomplish a similar scan. In certain embodiments, the transducer may be disposed on a portion of a downhole tool that rotates, e.g., as part of a bottom hole assembly ("BHA") disposed on a drill string.

After the echo signal 211 is received, the rotating head transducer 209 may be rotated to a second orientation within the wellbore 201. Another pulse may then be transmitted from the rotating head transducer 209, and a corresponding echo signal may be received. The rotating head transducer 209 may then be rotated to a third orientation within the wellbore 201 and yet another pulse may then be transmitted from the rotating head transducer 209, and a corresponding echo signal may be received. The first, second, and third orientations may but are not required to be equal rotational intervals with respect to the tool 204. For instance, the angular difference between the orientations may be modified in real time depending on the signals received and the granularity of the resulting measurements, with smaller rotational intervals corresponding to a higher granularity. In certain embodiments, this process may continue until the rotating head transducer 209 has completed a rotation, at which point the tool 204 may be positioned at a different depth. The group of measurements taken at a particular depth may be referred to as a "scan." The number of measurements taken to complete a scan may depend, for instance, on the granularity required by the combined measurements as well as downhole conditions.

In some embodiments, the transducer may generate acoustic signals 211 including, but not limited to, pure tone pulses of different or the same frequency, broadband impulses, tuned pulses, or any combination thereof.

In certain embodiments, a controller may be communicably coupled to the transducer. The controller may comprise a control unit located within the downhole tool, at the surface, or a combination of the two. The controller may be configured to cause the transducer to generate one or more signals and/or receive one or more acoustic reflections.

Figure 2:
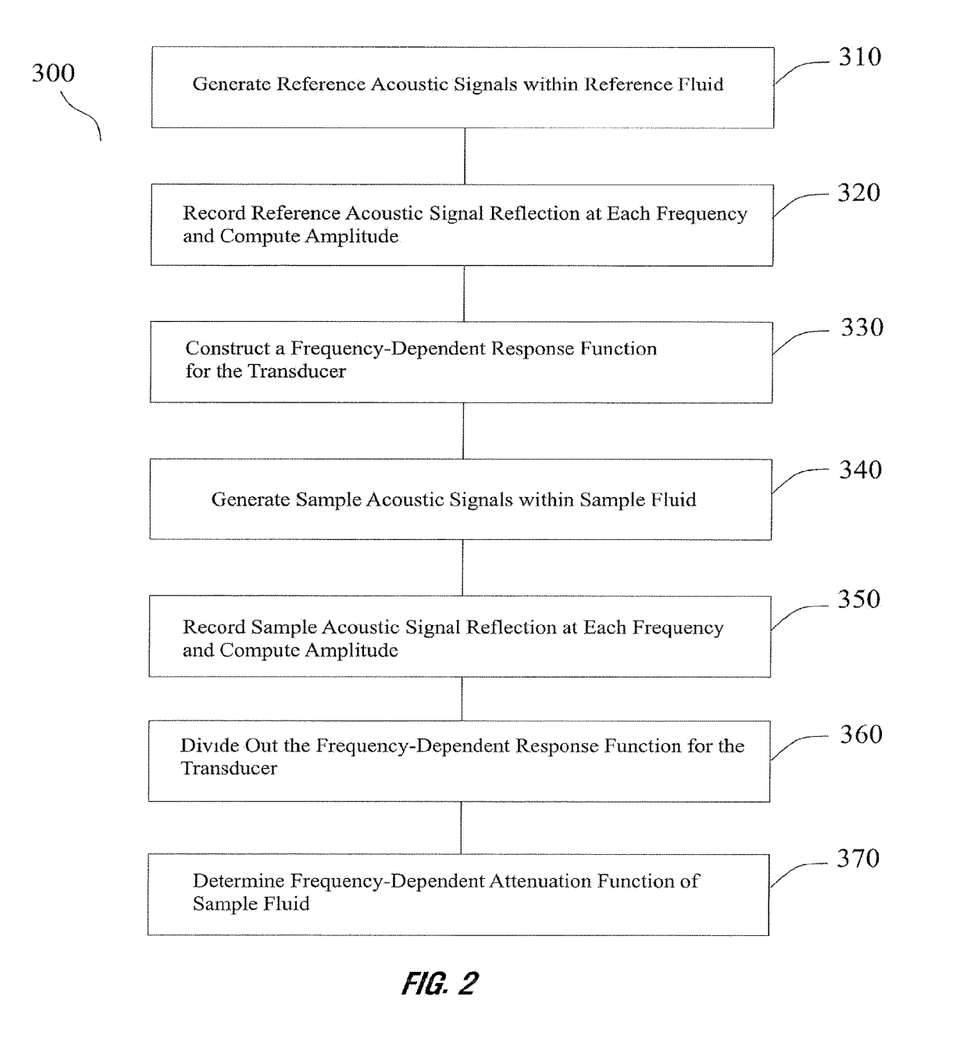
FIG. 2 is a flow diagram illustrating a method for determining frequency-dependent attenuation according to certain embodiments of the present disclosure.

FIG. 2 is a flow diagram illustrating a method for determining frequency-dependent attenuation according to certain embodiments of the present disclosure. In certain embodiments, the method 300 may be performed in-situ using a mud cell or rotating transceiver reflecting off a portion of a wellbore (e.g. the wellbore 201). In some embodiments, a mud cell and a rotating transceiver may be used to concurrently measure fluid properties (e.g., sound velocity) and frequency dependent attenuation, respectively. In some embodiments, the method 300 may be performed ex-situ. At step 310, one or more reference acoustic signals are generated within a reference fluid. The one or more reference acoustic signals may be generated by a transmitter or transceiver such as the transducer 205 or the rotating head transducer 209 shown in FIG. 1. The one or more reference acoustic signals may include, but are not limited to, a plurality of pure tone pulses, a tuned pulse, a broadband impulse, and any combination thereof. In some embodiments, a tuned pulse may comprise four to five different cycles described by a center frequency and a bandwidth. In some embodiments, the reference fluid may be any chosen fluid, while in other embodiments, the reference fluid is a fluid with a known attenuation response. In at least one embodiment, the reference fluid may be water.

At step 320, one or more reference acoustic signal reflections are received and recorded and the amplitude of each signal reflection is computed for each frequency. In some embodiments, the one or more reference acoustic signal reflections are received after reflection off an acoustic target. Each of the one or more reference acoustic signal reflections may include an initial reflection portion and a resonance portion. An initial reflection portion may be the portion of the signal that reflected from the drilling fluid-casing interface. In some embodiments, the acoustic target may be a steel block or a portion of a wellbore (e.g., casing, cement, etc.). The reflection of each type of generated signal (e.g., pure tones of different frequencies, a tuned pulse, a broadband impulse) may be processed differently. In certain embodiments, signal processing may be carried out by an information handling system in-situ or on the surface.

At step 330, a frequency-dependent response function for the transducer (or other transmitter) is constructed. In some embodiments, the frequency-dependent response function is based, at least in part, on the known properties of the reference fluid and/or the one or more received acoustic signal reflections. In some embodiments, the frequency-dependent response function may be based on response of a reference signal traveling through a reference fluid (e.g., water).

At step 340, one or more sample acoustic signals are generated within a sample fluid. In certain embodiments, the one or more sample acoustic signals may be generated by a transmitter or transceiver such as the transducer 205 or rotating head transducer 209 shown in FIG. 1. The one or more sample acoustic signals may include, but are not limited to, a plurality of pure tone pulses, a tuned pulse, a broadband impulse, and any combination thereof. In some embodiments, a tuned pulse may comprise four to five different cycles described by a center frequency and a bandwidth. The one or more generated sample acoustic signals may be the same or different from the one or more reference acoustic signals generated within the reference fluid. The sample fluid may be at least one of a drilling fluid (e.g. an oil-based mud), a wellbore treatment fluid, other wellbore fluid, or other fluid. At step 350, one or more sample acoustic signal reflections are received and recorded and the amplitude is computed at each frequency. Each of the one or more sample acoustic signal reflections may include an initial reflection portion and a resonance portion. An initial reflection portion may be the portion of the signal that reflected from the drilling fluid-casing interface. In some embodiments, the one or more sample acoustic signal reflections are received after reflection off an acoustic target. In certain embodiments, the acoustic target may comprise a steel block within a mud cell of a downhole tool. In some embodiments, the acoustic target may comprise a portion of a wellbore and include, without limitation, casing, cement layer, cement layer—casing bond, drilling fluid—casing bond, or any combination thereof.

At step 360, the frequency-dependent response function for the transducer is divided out of the one or more sample acoustic reflections recorded in step 350. At step 370, the frequency-dependent attenuation function of the sample fluid is determined. In certain embodiments, the frequency-dependent attenuation function is determined based, at least in part, on the one or more sample acoustic reflections and the frequency-dependent response function of the transducer. In certain embodiments, the frequency-dependent attenuation function is determined based, at least in part, on at least one of the initial reflection portions of the one or more sample acoustic signal reflections. In some embodiments, a controller communicably coupled to a transducer may be configured to determine the frequency-dependent attenuation function of the sample fluid based, at least in part, on at least one of the initial reflection portions. In certain embodiments, the frequency-dependent attenuation function of the sample fluid may be determined by dividing the frequency-dependent response function out of the one or more sample acoustic signal reflections. In some embodiments, the frequency-dependent attenuation function may be described by Equation (1):

$$\text{Loss in dB/inch} = \alpha_1 f + \alpha_0 \qquad (1)$$

where f is frequency, $\alpha_1$ is the slope and $\alpha_0$ is the intercept. In certain embodiments, the frequency-dependent response function may be determined by fitting attenuation response data (e.g., the one or more sample acoustic reflections) to a model. In certain embodiments, the model may be a linear model such as Equation (1). In some embodiments, a controller communicably coupled to a transducer may be configured to determine a frequency-dependent attenuation function of the sample fluid based, at least in part, on the one or more sample acoustic signal reflections and the frequency-dependent response function.

Figure 3:
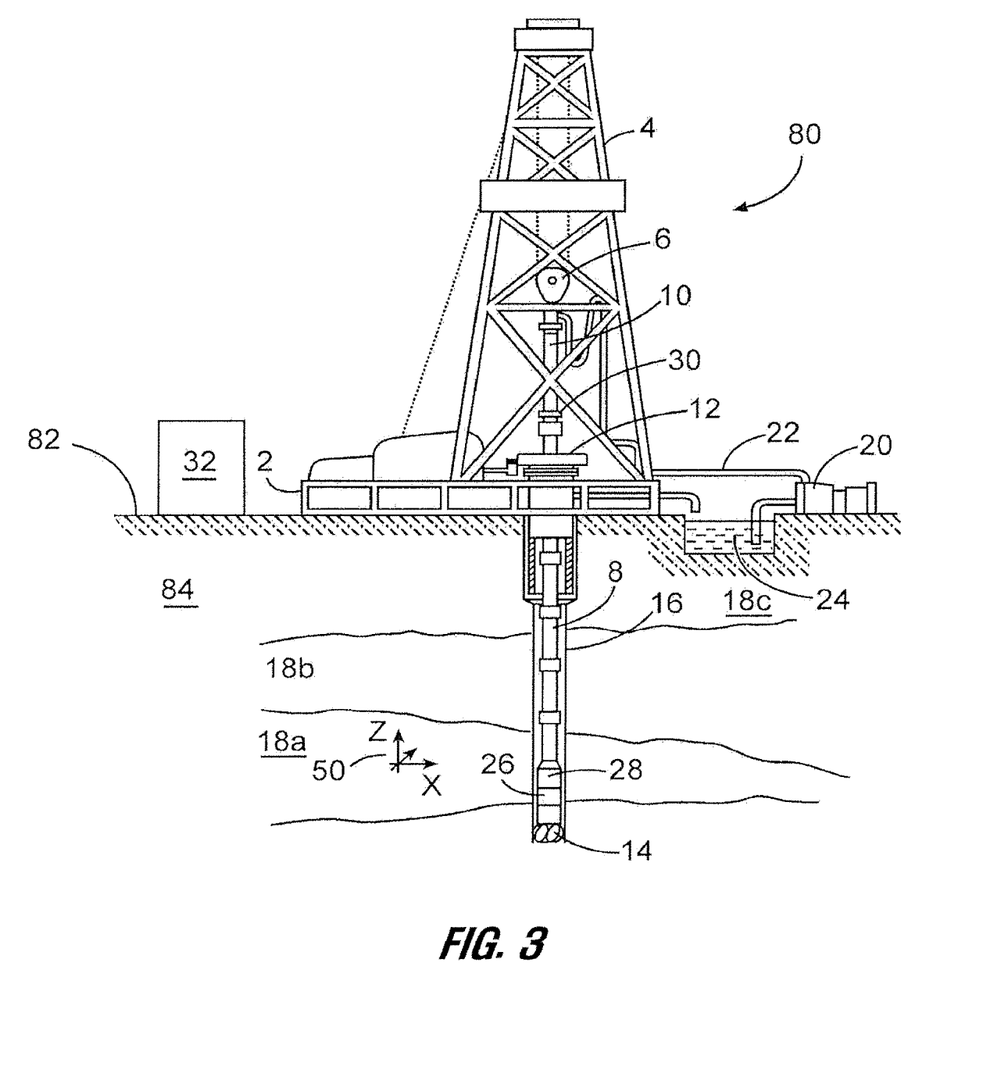
FIG. 3 is a diagram illustrating an example drilling system, according to certain embodiments of the present disclosure.

One or more of the apparatus, systems, and/or methods described above may be incorporated into/with a wireline tool/sonde for wireline logging operation or into/with one or more LWD/MWD tools for drilling operations. FIG. 3 is a diagram showing a subterranean drilling system 80 incorporating at least one acoustic LWD/MWD tool 26, according to aspects of the present disclosure. The drilling system 80 comprises a drilling platform 2 positioned at the surface 82. As depicted, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a wellbore 16 that passes through one or more rock strata or layers 18a-c. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the wellbore 16 into the pit 24 and aids in maintaining integrity or the wellbore 16.

The drilling system 80 may comprise a bottom hole assembly (BHA) coupled to the drill string 8 near the drill bit 14. The BHA may comprise various downhole measurement tools and sensors and LWD and MWD elements, including the acoustic tool 26. In one or more embodiments, the tool 26 may comprise acoustic pulse excitation and echo/reflection reception functionality that will be described in detail below. As the bit extends the wellbore 16 through the formations 18a-c, the tool 26 may collect measurements relating to wellbore 16 and the formation 84. In certain embodiments, the orientation and position of the acoustic tool 26 may be tracked using, for example, an azimuthal orientation indicator, which may include magnetometers, inclinometers, and/or accelerometers, though other sensor types such as gyroscopes may be used in some embodiments.

In certain embodiments, signals received by the acoustic tool 26 may be transmitted to one or more processors or information handling systems (not shown) associated with the tool 26, where they can be processed, for example, to determine physical characteristics of the wellbore 16. The one or more processors associated with the tool 26 could be, for example, wholly within the tool 26, located at the surface, or a combination of the two (e.g. some processing occurring downhole and some done at the surface).

The tools and sensors of the BHA including the tool 26 may be communicably coupled to a telemetry element 28. The telemetry element 28 may transfer measurements from acoustic tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 82. The surface control unit 32 may comprise an information handling system communicably coupled to the surface receiver 30 and may receive measurements from the acoustic tool 26 and/or transmit commands to the acoustic tool 26 though the surface receiver 30. The surface control unit 32 may also receive measurements from the acoustic tool 26 when the acoustic tool 26 is retrieved at the surface 82. As is described above, the surface control unit 32 may process some or all of the measurements from the acoustic tool 26 to determine certain parameters of downhole elements, including the wellbore 16 and formation 84.

Figure 4:
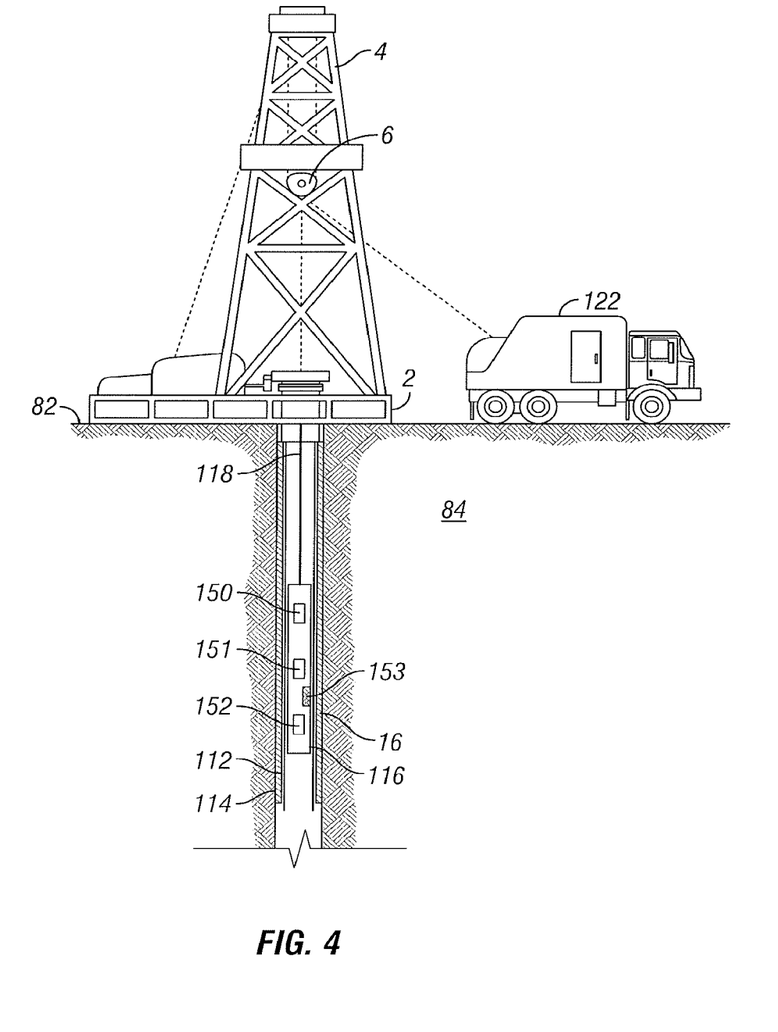
FIG. 4 is a diagram illustrating an example well drilling and completion system according to certain embodiments of the present disclosure.

At various times during the drilling process, the drill string 8 may be removed from the wellbore 16. Once the drill string 8 has been removed, measurement/logging operations can be conducted using a wireline tool 116 as shown in FIG. 4. The wireline tool 116 may comprise an acoustic tool similar to the acoustic tool 26 described above. Although FIG. 4 depicts a closed hole embodiment, measurement/logging operations with the wireline tool 116 may also be performed in an open hole.

As the wellbore 16 is extended, one or more pipes or casings may be inserted into and secured within the wellbore 110. As depicted, a single casing 112 is secured within the wellbore 110 via a cement layer 114 that substantially fills the annulus between the casing 112 and the wellbore 110. The casing 112 may comprise a metal tubular with a pre-determined length and diameter that is specifically selected for a particular depth in the formation 106. Although only one casing 112 is shown in FIG. 4, multiple casings may be used, including in a telescopic orientation where casings with progressively smaller diameters are used as the wellbore 110 extends further into the formation 106. The casing 112 may prevent the wellbore 110 from collapsing, prevent sensitive formation strata from exposure to downhole fluids, and prevent unwanted formation fluids from entering the wellbore 110.

A downhole tool 116 may be positioned within the wellbore 110 and casing 112 and include one or more transmitters 150, receivers 151, and/or transceivers 152 to perform measurement/logging operations. In some embodiments, the downhole tool 116 may comprise a mud cell 153 into which drilling fluid may flow and be measured and/or analyzed. As depicted, the downhole tool 116 comprises a wireline tool 116 that is suspended within the wellbore 110 and casing 112 via a cable 118 and a hook 120. The cable 118 may comprise wireline, slickline, coiled tubing, etc. The downhole tool 116 may be communicatively coupled to a logging facility 122 by the cable 118. The logging facility 122 (shown as a truck, although it may be any other structure) may collect measurements from the downhole tool 116, and may include computing facilities (including, e.g., an information handling system) for controlling, processing, storing, and/or visualizing the measurements gathered by the downhole tool 116 and communicated to the computing facilities through the cable 118. Controlling the operation of the downhole tool 116 may comprise sending control signals to cause the downhole tool 116 to take measurements. Although the computing facilities are described above with respect to the logging facility 122, freestanding computing facilities and/or information handling systems may be used to control, process, store, and/or visualize the measurements gathered by the downhole tool 116.

According to aspects of the present disclosure, the downhole tool 116 may be used to evaluate the wellbore 110 and, specifically, the cement layer 114 between the casing 112 and the wellbore wall 110. The cement layer 114 may secure the casing 112 within the wellbore 110 by forming a bond with the casing and a bond with the formation at the wall of the wellbore 110. In some embodiments, the downhole tool 116 may be used to measure the frequency-dependent attenuation of a fluid in the wellbore 110. In some embodiments, frequency-dependent attenuation may be determined using a mud cell 153.

In certain embodiments, signals received by the transceiver 152 may be transmitted to one or more processors or information handling systems (not shown) associated with the tool 116, where it can be processed, for example, to determining physical characteristics (e.g., impedance, thickness, slowness, reflectance) of the casing 112 and cement layer 114. The one or more processors associated with the tool 116 could be, for example, wholly within the tool 116, located at the surface, or a combination of the two (e.g., some processing occurring downhole and some done at the surface).

EXAMPLES

The following examples were carried out in ex-situ conditions using a rotating head transducer and oil-based muds.

Example 1

Figure 5:
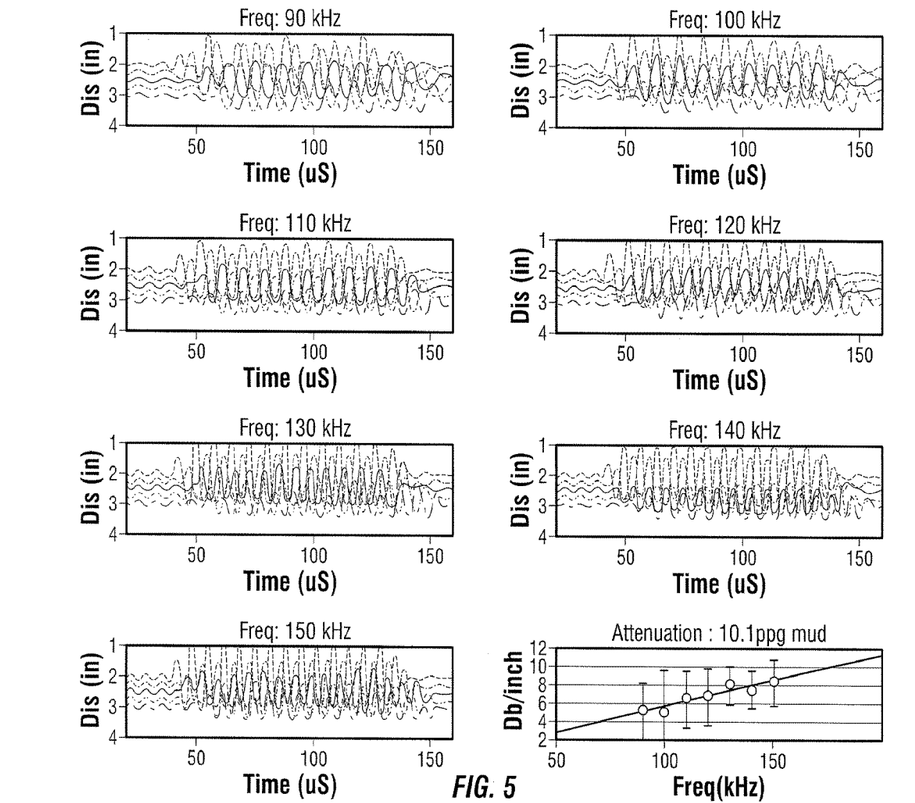
FIG. 5 is a set of graphs illustrating waveforms for frequency components of a received acoustic signal and the resulting attenuation response function according to certain embodiments of the present disclosure.

In this example, pure tone bursts of different frequencies were generated within a 10.1 ppg oil-based mud at various known standoff distances. FIG. 5 is a set of graphs illustrating time domain waveforms of the received signals for each tone and the resulting attenuation response function for the 10.1 ppg oil-based mud. The resulting attenuation response data was fit to a linear model to determine a frequency-dependent attenuation response function. The attenuation response function for this example is represented by Equation (2):

$$\text{dB Loss/inch} = 0.0571f - 0.02 \quad (2)$$

where f is frequency in kHz.

Example 2

Figure 6A:
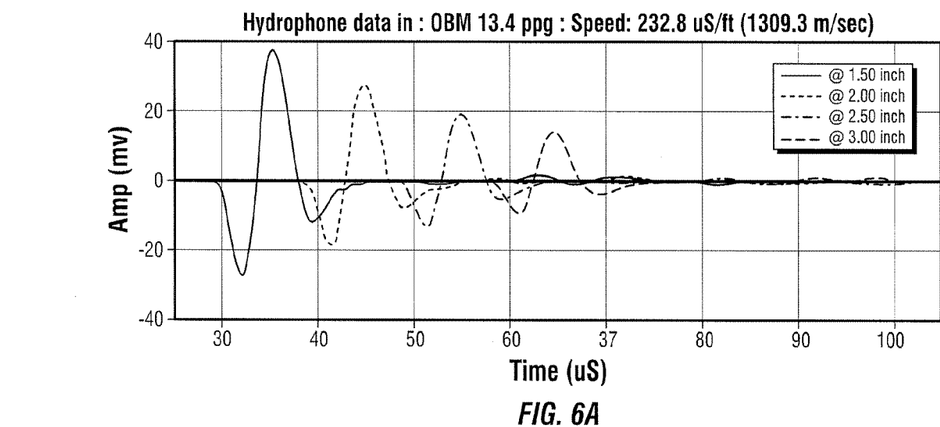
FIGS. 6A-C are graphs illustrating waveforms for tuned pulse acoustic signals and an attenuation response according to certain embodiments of the present disclosure.
Figure 6B:
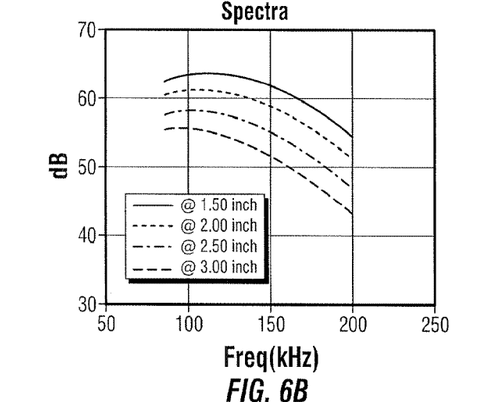
Figure 6C:
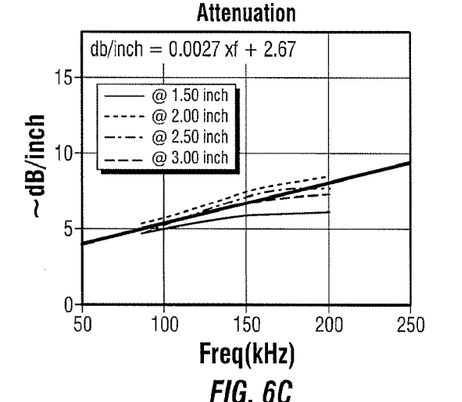

In this example, tuned pulses were generated within a 13.4 ppg oil-based mud. FIGS. 6A-C are graphs illustrating waveforms for the tuned pulse acoustic signals and the corresponding mud attenuation response function. FIG. 6A is a graph of the acoustic signals received at various known standoff distances. FIG. 6B is a graph relating attenuation to frequency for various known standoff distances. FIG. 6C is a graph of the resulting linear frequency-dependent attenuation function modeled using the data of FIGS. 6A and 6B. In this example, the calculated attenuation function is represented by Equation (3):

$$dB\ Loss/inch=0.027f+2.67. \quad (3)$$

An example method may include generating one or more reference acoustic signals within a reference fluid. One or more reference acoustic signal reflections may be received. A frequency-dependent response function may be determined based, at least in part, on the one or more reference acoustic signal reflections. One or more sample acoustic signals may be generated within a sample fluid. One or more sample acoustic signal reflections may be received. A frequency-dependent attenuation function of the sample fluid may be determined based, at least in part, on the one or more sample acoustic signal reflections and the frequency-dependent response function.

In one or more embodiments described in the preceding paragraph, at least one of the one or more reference acoustic signals and the one or more sample acoustic signals comprise a plurality of pure tone pulses.

In one or more embodiments described in the preceding two paragraphs, at least one of the one or more reference acoustic signals and the one or more sample acoustic signals comprise a tuned pulse.

In one or more embodiments described in the preceding three paragraphs, at least one of the one or more reference acoustic signals and the one or more sample acoustic signals comprise a broadband impulse.

In one or more embodiments described in the preceding four paragraphs, determining a frequency-dependent attenuation function of the sample fluid comprises dividing the frequency-dependent response function out of the one or more sample acoustic signal reflections.

In one or more embodiments described in the preceding five paragraphs, determining a frequency-dependent attenuation function comprises fitting attenuation response data to a model.

In one or more embodiments described in the preceding six paragraphs, the one or more reference acoustic signals travel a known standoff distance.

In one or more embodiments described in the preceding seven paragraphs, the one or more sample acoustic signals are generated by a downhole tool disposed in a wellbore, wherein the downhole tool comprises a transducer.

In one or more embodiments described in the preceding eight paragraphs, the downhole tool comprises a rotating head to which the transducer is coupled.

In one or more embodiments described in the preceding nine paragraphs, the downhole tool comprises a mud cell.

In one or more embodiments described in the preceding ten paragraphs, the one or more sample acoustic signals reflect off an acoustic target within the mud cell.

In one or more embodiments described in the preceding eleven paragraphs, the one or more sample acoustic signals reflect off a portion of the wellbore.

In one or more embodiments described in the preceding twelve paragraphs, the sample fluid is a wellbore treatment fluid.

An example method may include generating one or more sample acoustic signals with a rotating head transducer within a sample fluid in a wellbore. One or more sample acoustic signal reflections may be received at the rotating head transducer from at least a portion of the wellbore, wherein each of the one or more sample acoustic signal reflections comprises an initial reflection portion. A frequency-dependent attenuation function of the sample fluid may be determined based, at least in part, on at least one of the initial reflection portions.

In one or more embodiments described in the preceding paragraph, the one or more sample acoustic signals comprise a plurality of pure tone pulses.

In one or more embodiments described in the preceding two paragraphs, the one or more sample acoustic signals comprise a tuned pulse.

In one or more embodiments described in the preceding three paragraphs, one or more sample acoustic signals comprise a broadband impulse.

An example system may include a downhole tool. A transducer may be coupled to the downhole tool. A controller may be communicably coupled to the transducer and configured to cause the transducer to generate one or more sample acoustic signals; cause the transducer to receive one or more sample acoustic signal reflections, wherein each of the one or more sample acoustic signal reflections comprises an initial reflection portion; and determine a frequency-dependent attenuation function of the sample fluid based, at least in part, on at least one of the initial reflection portions.

In one or more embodiments described in the preceding paragraph, the downhole tool comprises a rotating portion to which the transducer is coupled.

In one or more embodiments described in the preceding two paragraphs, the one or more sample acoustic signals comprise a plurality of pure tone pulses.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:
    generating one or more reference acoustic signals within a reference fluid;
    receiving one or more reference acoustic signal reflections;
    determining a frequency-dependent response function based, at least in part, on the one or more reference acoustic signal reflections;
    generating one or more sample acoustic signals within a sample fluid;
    receiving one or more sample acoustic signal reflections; and
    determining a frequency-dependent attenuation function of the sample fluid based, at least in part, on the one or more sample acoustic signal reflections and the frequency-dependent response function.

2. The method of claim 1 wherein at least one of the one or more reference acoustic signals and the one or more sample acoustic signals comprise a plurality of pure tone pulses.

3. The method of claim 1 wherein at least one of the one or more reference acoustic signals and the one or more sample acoustic signals comprise a tuned pulse.

4. The method of claim 1 wherein at least one of the one or more reference acoustic signals and the one or more sample acoustic signals comprise a broadband impulse.

5. The method of claim 1, wherein determining a frequency-dependent attenuation function of the sample fluid comprises dividing the frequency-dependent response function out of the one or more sample acoustic signal reflections.

6. The method of claim 1, wherein determining a frequency-dependent attenuation function comprises fitting attenuation response data to a model.

7. The method of claim 1, wherein the one or more reference acoustic signals travel a known standoff distance.

8. The method of claim 1, wherein the sample fluid is a wellbore treatment fluid.

9. The method of claim 1, wherein the one or more sample acoustic signals are generated by a downhole tool disposed in a wellbore, wherein the downhole tool comprises a transducer.

10. The method of claim 9, wherein the downhole tool comprises a rotating head to which the transducer is coupled.

11. The method of claim 10, the one or more sample acoustic signals reflect off a portion of the wellbore.

12. The method of claim 9, wherein the downhole tool comprises a mud cell.

13. The method of claim 12, wherein the one or more sample acoustic signals reflect off an acoustic target within the mud cell.

* * * * *